Dec. 10, 1929.  W. M. JONES, JR  1,738,583
STEERING AXLE
Filed Aug. 24, 1922
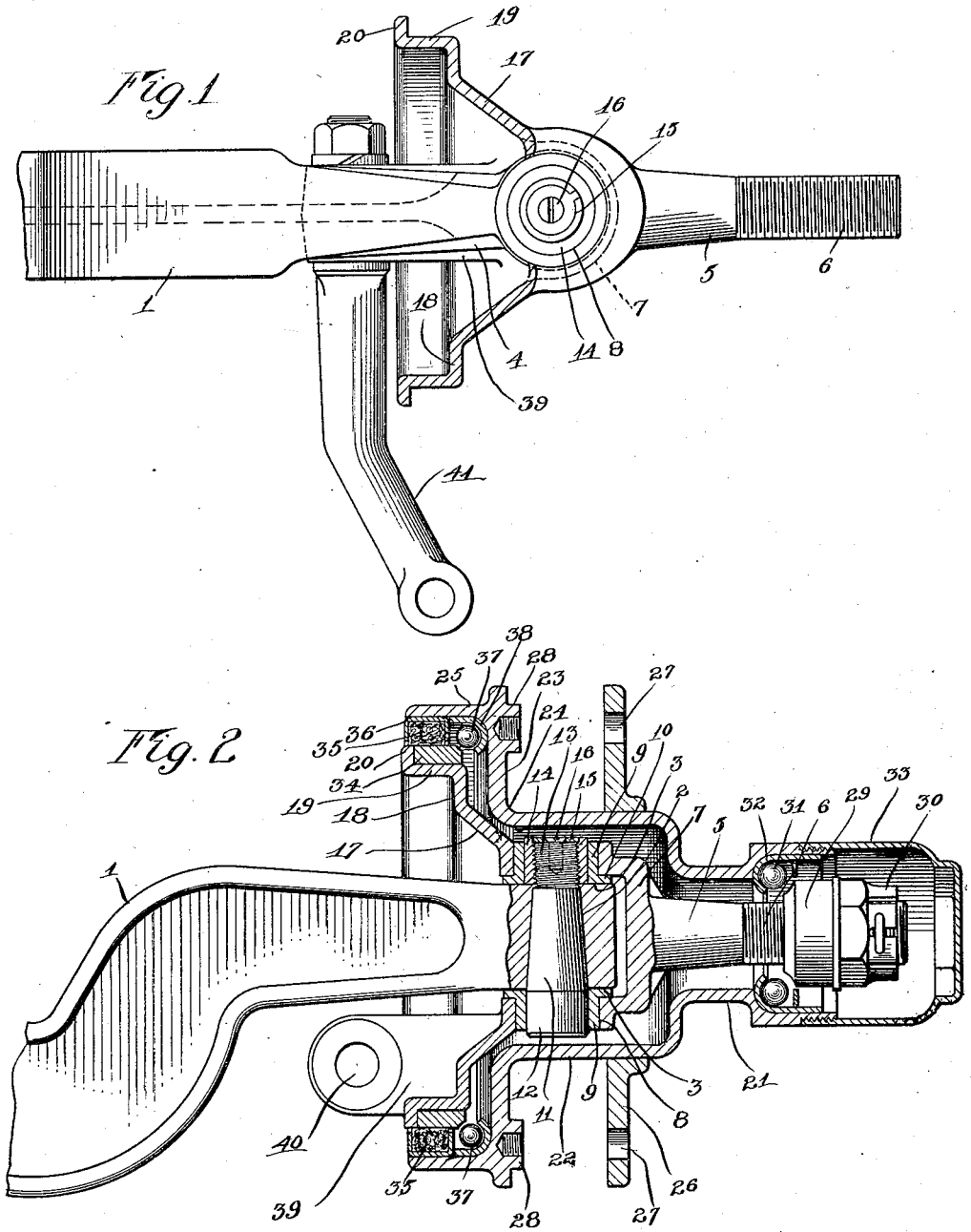
INVENTOR.
William Martin Jones, Jr.
BY Davis & Simms
his ATTORNEYS.

Patented Dec. 10, 1929

1,738,583

UNITED STATES PATENT OFFICE

WILLIAM MARTIN JONES, JR., OF ROCHESTER, NEW YORK

STEERING AXLE

Application filed August 24, 1922. Serial No. 584,108.

The present invention relates to steering wheels for vehicles and an object thereof is to provide a construction in which the pivot of the steering mechanism is arranged in the plane of the wheel and the parts are so associated therewith that a spoke wheel of standard construction, such as employed on Ford automobiles, may be connected therewith. A further object of this invention is to provide in a construction such as above set forth, a maximum swinging movement of the wheel while at the same time giving strength and durability.

To these and other ends, the invention consists of certain parts and combinations of parts, all of which will be hereinafter described: the novel features being pointed out in the appended claims.

In the drawings:

Fig. 1 is a plan view of the spindle member partially in section showing the connection of the latter with the axle; and Fig. 2 is a vertical section through the steering mechanism.

Referring to the illustrated embodiment, 1 indicates the axle having at its end a vertical opening 2 tapered throughout its length, the top and bottom surface of the end of the axle adjacent said opening being formed with bearing surfaces 3. The axle on its two vertical sides gradually becomes narrower on opposite sides of the horizontal median line at 4, so as to produce a substantially oval cross section in proximity to the bearings 3. To this axle the spindle member is connected. This spindle member embodies a reduced portion 5 screw threaded at 6 and connected at its inner end to a hollow central portion 7, which is provided with two vertically aligned openings 8 of equal diameters, in which two bearing bushings 9 are fitted. These bushings have flanges at 10 at their inner ends resting on the bearing surfaces 3. To connect the spindle member to the axle, a pivot pin is employed preferably with a tapering portion 11 fitting in the tapered opening 2 of the axle and a cylindrical portion 12 fitting in one of the bushings 9. The opposite end of this taper pin is screw threaded at 13 and on this screw threaded portion a nut 14 is arranged, this nut having a cylindrical outer surface, the diameter of which is equal to the diameter of the cylindrical portion 12. This cylindrical portion fits in the other bushing 9, so that it is possible to employ two bushings of like size and form. A locking disk 15 is held to the end of the pin 11 by a screw 16 and holds the nut 14 against turning on the pivot pin. On the inner side of the circular portion 7 the spindle member has a flaring portion 17 which connects with a portion 18 arranged at right angles to the axis of the spindle. The portion 18 in turn connects with a portion 19 which is concentric with the axis of the spindle and beyond this portion 19 and at the extreme inner portion there is provided a portion 20 at right angles to the axis of the spindle member. This construction of the spindle member beyond the reduced portion 5 together with the oval shape of the axle in proximity to the bearings 3 permits the spindle member to have a maximum movement on the axle.

Surrounding the spindle is a hub comprising, in this instance, an outer tubular portion 21 extending from a central portion 22 of greater diameter than the outer portion, the central portion 22 having one of the hub plates 23 formed integrally therewith at the inner end thereof and projecting outwardly from said portion 22. The hub plate 23 connects with the portion 22 through a curved bend or portion 24 which lies opposite the portion 17 of the spindle. Extending inwardly from the hub plate 23 is an annular flange 25 which surrounds the portions 19 and 20 of the spindle. A hub plate 26 is adjustable on the cylindrical outer surface 22 of the hub to clamp the spokes between such hub plate and the hub plate 23, this clamping being effected by bolts introduced through openings 27 in the hub plate 26 and anchored in bosses 28 formed with the sockets with screw threaded walls and projecting from the face of the hub plate 23 opposed to the hub plate 26, these anchoring bosses lying within the lines of the annular flange 25. By providing these bosses on this face of the hub plate 23 a proper anchorage for the bolts is obtained without interfering with the space between the hub and the spindle, and at the same time, spokes of standard form may be employed.

The supporting of the hub on the spindle is obtained through two anti-friction bearings. One of these bearings is situated on the inner side of the turning axis of the spindle while the other bearing is situated on the outer side of the turning axis. The bearing on the outer side of the turning axis is formed by a ring or collar 29 secured on the screw threaded portion 6 of the spindle member and held thereon by a nut 30. With this bearing an annular series of balls 31 cooperates, these balls also cooperating with a bearing ring 32 fitted in the end of the portion 21 of the hub. A cap 33 has screw threaded engagement with the portion 21 to close the end of the hub.

The inner bearing of the hub is formed by a ring 34 which seats upon the portion 19 of the spindle and rests against the portion 20. This bearing ring 34 is of a thickness equal to the width of the portion 20, so that the outer surface of the ring is flush with the edge of the portion 20, in order that a dust excluding ring 35 may cooperate with both of these parts to exclude dust from the bearing, the dust excluding ring being held in an internally grooved or channelled ring 36 secured to the portion 25 of the hub. Cooperating with the inner edge of the ring 34 is an annular series of balls 37 or other antifriction devices which also cooperate with a ring 38 situated at the junction of the annular flange 25 with the hub plate 23. It will be noted that owing to the curved portion 24, the angle of flaring of the portion 17 is materially increased, thus giving a greater swinging action to the spindle. Furthermore, the bearing on the inner side of the hub is situated at a position where it will not interfere with the maximum swinging action of the spindle. This is due to the fact that the flange 25 projects from the hub plate 23 near the periphery of the latter and the spindle has a seat for the ring 34 situated beyond the cone which would be formed by extending the portion 17. This is facilitated by providing the boss for the spoke securing bolts on that face of the plate 28 opposed to the plate 26. A lug 39 is extended from the inner end of the spindle member below the axle and is provided with an opening 40 in which a steering arm 41 is secured.

This construction is especially designed for employing spoke wheels of standard construction and particularly wheels now employed on Ford automobiles. In other words, the standard wheel may without any material changes therein be fitted to the hub so as to obtain a pivoting of the wheel in line with the plane of the spoke and, at the same time, a maximum swinging motion of the spindle may be secured. A novel means is provided for pivotally connecting the axle to the spindle, this being in the form of a tapered pin having at one end a cylindrical bearing portion and at the other end a nut with a cylindrical bearing which has a diameter equal to that of the diameter of the portion of the pin so that the bearings at opposite ends of the pivot pin are the same, while the latter is firmly and removably held in place.

What I claim as my invention and desire to secure by Letters Patent is:

1. In combination with an axle having a tapered vertical opening, and bearings around the opposite ends of said opening, a spindle having a hollow portion in which the axle extends, said hollow portion being provided with aligned openings, bushings fitted in said openings and having flanges resting against the bearings on the axle about said tapered opening, a taper pin having a cylindrical bearing at one end fitted in one of the bushings, and a nut at the opposite end with a cylindrical bearing fitted in the other of the bushings.

2. In combination with an axle, a spindle member pivotally mounted on said axle to turn about an upright axis, a hub mounted to turn on the spindle member and having two hub plates lying in planes on opposite sides of the upright axis so that the spokes of the wheel are in the plane of the axis, the inner hub plate provided on its face opposed to the other hub plate with bosses formed with openings with screw threaded walls, said inner hub plate also having on its opposite side and beyond said screw threaded openings an annular flange adjacent the perimeter of the hub plate, and an antrifriction bearing arranged between said annular flange and the spindle.

WILLIAM MARTIN JONES, Jr.